Jan. 27, 1942.  A. B. HOHMANN  2,271,193
INDUSTRIAL THERMOMETER
Filed April 17, 1941
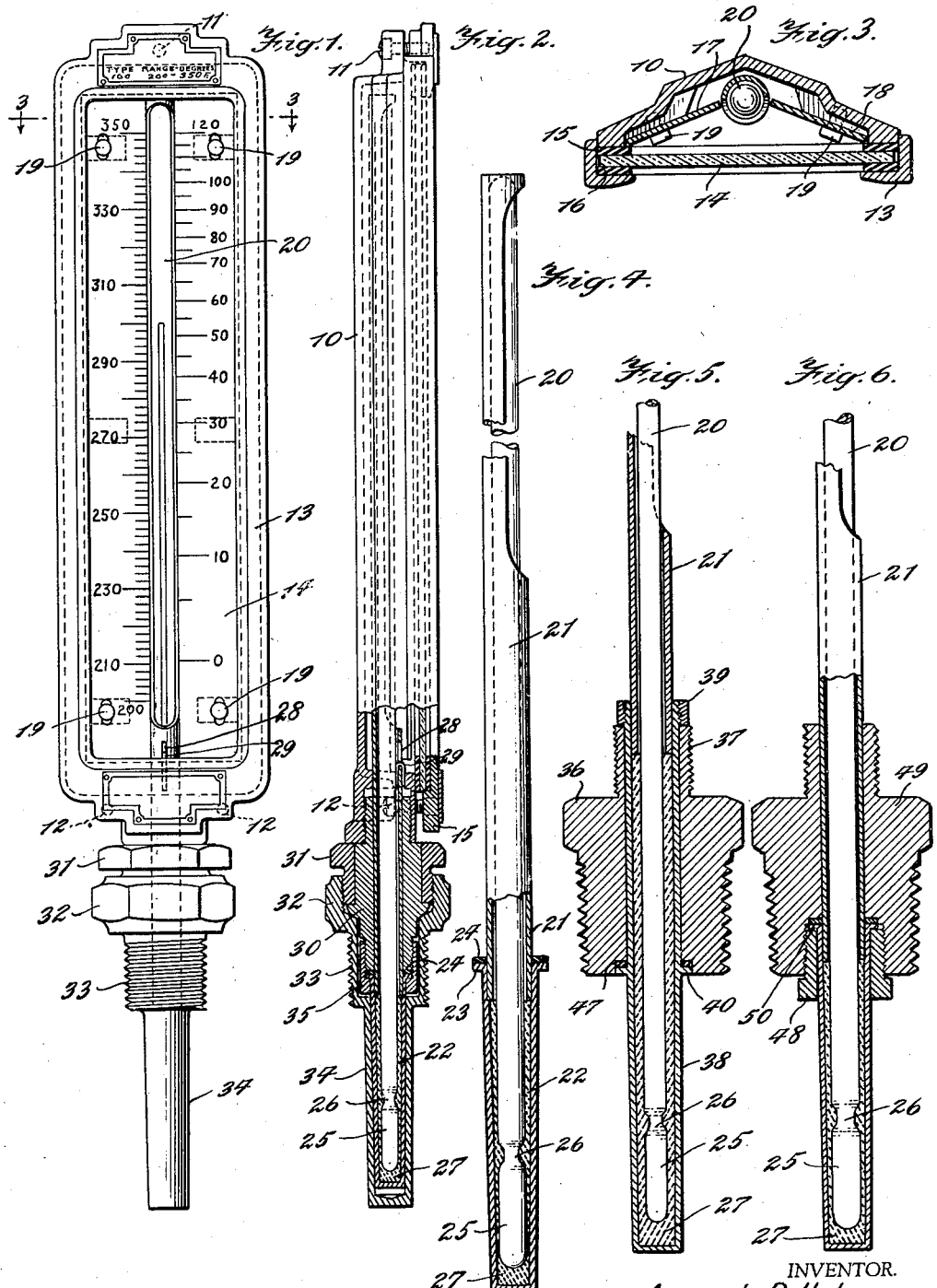
INVENTOR.
August B. Hohmann
BY Lackenbach & Hirschman
ATTORNEYS Patented Jan. 27, 1942

2,271,193

UNITED STATES PATENT OFFICE 2,271,193

INDUSTRIAL THERMOMETER

August B. Hohmann, New York, N. Y.

Application April 17, 1941, Serial No. 389,050

14 Claims. (Cl. 73—374)

The invention relates to industrial thermometers of the type utilized in boiler rooms and industrial plants, including those in which chemical processes are carried out involving the necessity of making precise measurements of temperatures at various stages of the process or of the ingredients entering into chemical reactions in the progressive stages constituting a complete processing operation.

More particularly, the invention relates to the type of such industrial thermometer in which an elongated tube containing an expansible material such as mercury, is enclosed in a metal casing, the upper portion of which is provided with a scale, indicating temperature, and the lower portion of the casing is provided with suitable means for attaching the same to a channel or conduit communicating with a material, usually a fluid, the temperature of which is to be indicated.

One type of such industrial thermometer conventionally used in the prior art, anchors the bulb, or lower portion of the mercury glass tube, in a metal head by means of a stuffing box, constituted of asbestos, which is rammed into the space between the head and the glass tube to anchor the glass tube in position. Another form of anchoring the tube in the metal head, in accordance with prior art constructions, has been to provide a spherical abutment upon the glass tube, such spherical abutment constituting the means of securing the glass tube in position.

A primary disadvantage of the prior art constructions, generally indicated hereinabove, is that the glass tube, and more particularly its lower portion, constituting the bulb acting as a reservoir for the mercury or other expansible fluid, is readily breakable, being apt to snap immediately above or below the stuffing box upon the instrument being violently jarred or otherwise placed under stress, for instance, by continued vibration. A continuous strain may also be placed upon the mercury tube if such tube is not in perfect alignment with the casing, for instance, if the packing is not carried out with the utmost care. Furthermore, if the glass tube is not securely packed, it has a tendency to slip upwardly or downwardly and thereby result in an erroneous temperature indication. The second form of anchoring the glass tube heretofore used, namely, the provision of a spherical abutment, likewise presents the same difficulties, as if the abutment is not completely spherical or the packing is compressed non-uniformly, the tube, when finally positioned, is likely to be out of perfect alignment, resulting in an undue strain thereon.

The conventional industrial thermometer utilizes mercury as the heat-conducting medium surrounding the bulb, for temperatures up to 600° F., and graphite or powdered metals, for temperatures above 600° F. When mercury is used as the heat-conducting medium, it is necessary to have a sufficient amount of mercury in the bulb chamber to completely cover the bulb of the glass tube. It is also necessary to provide a construction in which the mercury is completely confined in the bulb chamber, i. e., so that none of the mercury can leak out upon expansion thereof. The care in the measurement of the precise quantity of mercury to be filled in the bulb chamber to completely cover the bulbs of various sizes is such that failure by an ordinary skilled artisan to properly fill the bulb chamber will seriously affect the sensitivity and accuracy of indication to an extent which will render the thermometer useless for some operations and processes. It is to be remembered that the bulb chamber is never to be completely filled with the mercury heat-conducting medium, as space must be allowed for its expansion therein. The degree of sensitivity and accuracy of indications of the thermometer, therefore, rests completely in the skill and carefullness of the assembling workmen in filling the required amount of mercury in the bulb-chamber for complete coverage of the bulb, and allowing the required amount of space for the expansion of the mercury heat-conducting medium.

When the heat-conducting medium used is graphite or powdered metal, the medium is held within the bulb chamber by means of a screw plug which must be made absolutely tight to prevent the seepage into the bulb chamber of contaminating material such as steam, water, oil, dust, etc. A well recognized drawback of thermometers of the type utilizing graphite or metal powders, is that by reason of the air confined in the interstices between the granules of graphite or the metal powders, throughout the bulb chamber, such material does not constitute a very good heat-conducting medium and that, therefore, thermometers utilizing them are sluggish and frequently indicate temperatures as must as 10 to 15° lower than the actual temperature of the material being tested. Furthermore, it is extremely difficult to properly fill the bulb chamber with graphite and metal powders, as these materials readily settle and compact, so as to leave a space above the material, exposing the bulb or the thermometer to the confined air.

Industrial thermometers of this general type have the further disadvantage in the respect that if the glass tube containing the mercury column is broken, it is necessary to ship the entire unit back to the factory for repair, involving the insertion of an entirely new tube and appropriate scale. As industrial thermometers of this general type are very extensively used on shipboard, foreign countries, and generally inaccessible places such as mines and water-power plants, this problem of repair and replacement is a serious one.

In accordance with my invention, I provide an industrial thermometer of a construction which overcomes all of the disadvantages of the prior art structures hereinabove indicated, and utilizes a novel construction of armored glass tube mounted within the casing as a unit so as to be readily movable therefrom for repair or replacement purposes. My novel construction of industrial thermometers is also characterized by the utilization of a plastic heat-conducting medium having a neutral coefficient of expansion within the range of temperatures to be indicated by the thermometer, which is poured into the bulb-chamber until completely filled and the excess forced out by the insertion of the bulb end of the thermometer tube, and which, upon solidification, not only completely fills the bulb-chamber, assuring, without dependence on the human equation, complete coverage of the bulb, but also rigidly supports the tube without possibility of any movement up or down, and eliminating all present day packing methods. As the tube is enclosed in an armor, of which the bulb-chamber is an integral part, the thermometer tube will be in proper alignment, eliminating strain, a factor responsible for many breakages.

In its broadest aspects, therefore, my novel construction of industrial thermometer provides a metal armor for the glass tube, the armor and its contained glass tube being readily removable as a unit from the casing of the instrument. The armor thus supports the entire glass tube, preventing the destructive effect of any undue stress or strain applied thereto in the ordinary course of the life of the thermometer, particularly those of long length, which might be 5 ft. or more. My novel industrial thermometer is also extremely sensitive and accurate by reason of the use of a heat-conducting medium in the bulb chamber, such medium being constituted of a metallic paste rapidly solidifying to the hardness of metal and which will withstand the highest temperatures to which mercury type thermometers may be subjected, without change or deterioration. In accordance with my construction, the bulb chamber is integral with the armor, and is completely filled with the solidified metallic heat-conducting medium, the tube in the course of manufacture being inserted into the heat-conducting medium and the excess of the latter forced out, so that the bulb end of the tube will always be completely covered with the heat-conducting medium.

The specific material which I have discovered to be suitable for utilization as the heat conducting medium, is an amalgam of silver.

Other objects and advantages of my invention will appear to those skilled in the art from the following description.

Specific embodiments of my novel construction of industrial thermometer are illustrated in the accompanying drawing, in which Fig. 1 is a face view of the instrument;

Fig. 2 is a side view, partly in section, of the thermometer and casing;

Fig. 3 is a section on the line 3—3 of Fig. 1;

Fig. 4 is a view, partly in section, of the removable armored thermometer tube, with the bulb end thereof encased in a bulb chamber and embedded in the solidified metal heat-conducting medium;

Fig. 5 shows in cross-section, the application of my novel construction in a fixed thread connection thermometer, and Fig. 6 is a similar view of the same type of structure but with a different method of securing the integral unit to the hub casting.

Referring more particularly to the drawing, in which similar reference characters identify similar parts in the several views, 10 is the scale case casting of comparatively heavy metal formed in the shape of an obtuse dihedral angle. To such casting, by means of a bolt 11, at the top thereof, and similar bolts 12, 12 at the bottom thereof, is secured a cast metal frame 13 encompassing a glass plate 14. The end portions of the glass plate 14 are secured within the confines of a pair of gaskets 15 and 16, the former extending throughout the face of the scale case casting and the latter throughout the under surface of the front portion of the cast metal frame 13. By means of these two gaskets, a substantial hermetical sealing of the scale case is secured to prevent steam entering into the scale case and thereby discoloring the scales or preventing their ready reading. The gaskets, of course, perform the additional function of acting as a buffer against breakage of the glass plate 14.

Angularly disposed within the scale case casting, are adjustable scale plates 17 and 18 secured to the casting 10 by means of bolts 19 extending through slots in the scale plates, two of which are near the upper extremity of the scale plates and two near the lower extremity thereof. The scale plate 17 is provided with markings indicating temperature, while the scale plate 18 may be conveniently provided with indications of pressures corresponding to specific steam temperatures.

The glass capillary thermometer tube 20 is positioned centrally and near the apex of the scale case casting and is surrounded by a metal armor or sheathing 21, the sheathing being open at the front throughout the range of the scales to permit visual observation of the mercury line in the glass tube. The metallic armor or sheathing consists of two parts, namely, an upper part which covers the indicating portion of the thermometer stem, and a lower part, which forms a chamber 22 for the lower bulb portion of the thermometer. The lower end of the upper part telescopes into the upper end of the lower part. The lower portion of the armor thus constituted has a flange 23 upon which is seated a suitable gasket 24. The thermometer glass tube 20 terminates in a bulb 25 formed by a peripheral constriction 26 of the glass tube. The space constituting the bulb chamber 22 is filled in the manner hereinafter described with a solidified metal heat-conducting medium 27, the entire thermometer tube and its metal armor or sheathing being adapted to be removably inserted into the scale case casting. To maintain the thermometer tube within the scale case casting, in proper position to have the exposed face of such tube facing outwardly and to prevent its rotation in the casting, I provide a slot 28 in the armor at the base of the scale case, through which extends U-shaped member 29 positioned underneath the metal frame 13; such member, when thus set into the case underneath the removable metal frame, being effective to properly position the mercury tube. In assembling my novel industrial thermometer, the metal armor sheathing containing the mercury tube is inserted into the scale case casting from the bottom, it being passed through the connector 30, which is surrounded by a union nut 31 of conventional construction and internally threaded socket 32 having a depending portion 33 externally threaded to constitute the means of connection of the instrument to the pipe or conduit leading to the material to be tested. From the depending portion 33 of the socket extends an outer armor 34 within which is positioned the lower extremity of the metallic armor or sheathing 21 of the glass tube. A nut 35 has its internally projecting flange abut the flange 23 and when such nut is screwed home, it brings, through gasket 24, the lower part of the armor 21 against the lower extremity of the connector 30.

In Figs. 5 and 6, I have illustrated the application of my novel construction to a fixed thread connection thermometer. In Fig. 5, the hub 36 has an upwardly extending threaded portion 37 through which hub and its threaded portion extends the armor 38 of the glass tube, a nut 39 engaging the threaded upper extremity of the armor extension and securing the removable glass tube and armored unit within the hub. The armor extension is provided with a flange 40 intermediate its ends, which flange seats against a gasket 47 within a recess in the lower surface of the hub.

In Fig. 6, I have shown a slightly different form of fixed thread connection, in which the armor securing nut 48 is positioned below the hub 49, the interior of the hub being recessed at the bottom portion thereof to accommodate the securing nut 48, adapted to hold the armor of the glass tube in position by pressing against the flange 50.

From the above description, it will be evident that I have provided a construction of industrial thermometer in which a metallic armor supports the entire glass tube, such armor and glass tube being removable as a complete unit for purposes of repair and replacement. By providing a solidified heat-conducting medium for the thermometer bulb, completely filling the bulb-chamber, requiring no closure with cement or any other type of packing arrangement, I have produced a leak-proof compact, simplified, and rugged structure of maximum sensitivity, resulting in facility of assembly and rapid and accurate temperature indication.

The material constituting the heat-conducting medium may be any paste having a metallic base as an ingredient which will solidify and remain solid without expansion or contraction throughout the range of temperatures for which the thermometer has been designed. The material should therefore have a neutral coefficient of expansion within the range of use of the thermometer.

The material that I have found yields the results and advantages hereinabove set forth, and which has the characteristics making it suitable for the purpose, and which will not crush the cylindrical bulb of the thermometer, is a silver amalgam comprising approximately 70% silver and 1½-2% of chromium and tungsten combined. The alloy from which the amalgam is made may contain a small percentage of zinc and as much as 25-30% of tin. The alloy is amalgamated with mercury in the ratio of 5 parts of the alloy to 7½ or 8 parts of mercury by weight. Such an amalgam will harden and solidify in a period of between 45 minutes and 1 hour.

While I have described specific embodiments of my novel construction, it is obvious that various changes may be made therein without departing from my invention.

The present application is in part a continuation of my pending application, Serial No. 305,216, filed November 20, 1939.

I claim:

1. An industrial thermometer comprising a metal sheath, a glass tube terminating in a bulb and having an expansible medium therein, said sheath having a slot therein whereby the expansible medium in the indicating portion of the tube is visible, and substantially encircling said tube but leaving a space between the bulb and said sheath, a wall of solidified material in said space, said wall of solidified material being constituted of a paste rapidly solidifying to the hardness of metal, having a neutral coefficient of expansion, and of sufficient thickness to constitute a support for the bulb within the range of temperatures to be indicated by the thermometer.

2. An industrial thermometer comprising a scale case casting, a scale therein, a glass tube terminating in a bulb and having an expansible medium therein, a metal sheath substantially encircling said tube and being cut away throughout its portion opposite said scale to render the medium in the tube visible, and a connector by means of which the metal sheath and enclosed glass tube are removable, as a unit, from said scale case casting.

3. An industrial thermometer comprising a scale case casting, a scale therein, a glass tube terminating in a bulb and having an expansible medium therein, a metal sheath substantially encircling said tube but leaving a substantial space between the bulb and said sheath, and being cut away throughout its portion opposite said scale to render the medium in the tube visible, the space surrounding the bulb portion of said glass tube being completely filled with a mass of solidified heat-conducting metallic paste having a neutral coefficient of expansion of sufficient thickness to constitute a support for said bulb, and a connector by means of which the metal sheath and enclosed glass tube are removable, as a unit, from said scale case casting.

4. An industrial thermometer comprising a scale case, a scale therein, a glass capillary tube provided with a bulb, having an expansible medium therein, a metallic sheath for said tube, the upper portion of said sheath being cut away throughout the portion thereof extending along the scale, the lower portion of said sheath comprising a bulb chamber containing the lower portion of said tube and all of its bulb in spaced relation to the walls thereof, a mass of solidified heat-conducting medium, having a metallic base as an ingredient thereof and a neutral coefficient of expansion within the range of the thermometer, surrounding said bulb and a portion of the tube adjacent said bulb, whereby said solidified heat-conducting medium completely fills the space in the bulb chamber around the lower portion of the tube and bulb to anchor and maintain the glass tube in properly aligned and rigid position in the bulb chamber, and a connector by means of which said sheath and glass tube are removable as a complete unit from said scale case.

5. An industrial thermometer comprising a metal sheath, a glass tube terminating in a bulb and having an expansible medium therein, said sheath substantially encircling said tube but leaving a substantial space between the bulb and said sheath, and being cut away at the upper portion above said bulb to render the medium in the tube visible, the entire space between the lower portion of said sheath and said bulb being filled with a mass of heat-conducting material having a neutral coefficient of expansion and constituted of a silver amalgam of approximately 70% silver and 2% chromium and tungsten.

6. An industrial thermometer comprising a metal sheath, a glass tube terminating in a bulb and having an expansible medium therein, said sheath substantially encircling said tube but leaving a substantial space between the bulb and said sheath, and being cut away at the upper portion above said bulb to render the medium in the tube visible, the entire space between the lower portion of said sheath and said bulb being filled with a mass of heat-conducting material having a neutral coefficient of expansion and constituted of an amalgam of silver, chromium and tungsten.

7. In an industrial thermometer having a casing, a temperature indicating unit removably supported within the thermometer casing, comprising a transparent capillary tube terminating in a bulb and having an expansible medium therein, and a metal sheath substantially encircling said capillary tube but leaving a space between the bulb and said sheath, a mass of metallic paste filling said space solidified to the hardness of metal and having a neutral coefficient of expansion within the range of the thermometer, said metal sheath being cut away for a distance extending from the upper extremity thereof to a point above said bulb to render the capillary tube visible.

8. In an industrial thermometer having a casing, a temperature indicating unit removably supported within the thermometer casing, comprising a transparent capillary tube terminating in a bulb and having an expansible medium therein, and a metal sheath substantially encircling said capillary tube but leaving a space between the bulb and said sheath, a mass of a solidified silver amalgam filling said space having a neutral coefficient of expansion within the range of the thermometer, said metal sheath being cut away for a distance extending from the upper extremity thereof to a point above said bulb to render the capillary tube visible.

9. In an industrial thermometer having a casing, a temperature indicating unit removably supported within the thermometer casing, comprising a transparent capillary tube terminating in an elongated cylindrical bulb and having an expansible medium therein, and a metal sheath substantially encircling said capillary tube but leaving a substantial space between the bulb and said sheath, said metal sheath being cut away for a distance extending from the upper extremity thereof to a point above said bulb to render the capillary tube visible, the elongated cylindrical bulb portion of said glass tube being completely encased in a mass of solidified heat-conducting metallic paste having a neutral coefficient of expansion within the range of indication of the thermometer, solid within the range of temperatures to be indicated by the thermometer and, filling the lower portion of said sheath.

10. In an industrial thermometer having a casing, a temperature indicating unit removably supported within the thermometer casing, comprising a transparent capillary tube terminating in a bulb and having an expansible medium therein, a metal sheath encircling the capillary tube and having a cut-out portion through which the expansible medium may be viewed, said bulb being surrounded by a body of solidified heat-conducting metallic paste having a neutral coefficient of expansion within the range of the thermometer in direct contact with said bulb and the lower portion of said sheath and of sufficient thickness to constitute a support for said bulb.

11. In an industrial thermometer having a casing, a temperature indicating unit removably supported within the thermometer casing, comprising a transparent capillary tube terminating in a bulb and having an expansible medium therein, a metal sheath encircling the capillary tube and having a cut-out portion through which the expansible medium may be viewed, said bulb being surrounded by a body of solidified heat-conducting amalgam of 70% silver and 2% chromium and tungsten in direct contact with said bulb and the lower portion of said sheath and of sufficient thickness to constitute a support for said bulb.

12. In an industrial thermometer having a casing, a temperature indicating unit removably supported within the thermometer casing, comprising a transparent capillary tube terminating in a bulb and having an expansible medium therein, a metal sheath encircling the capillary tube and having a cut-out portion through which the expansible medium may be viewed, said bulb being surrounded by a body of solidified metallic paste constituted of a silver amalgam having a neutral coefficient of expansion within the range of the thermometer, in direct contact with said bulb and the lower portion of said sheath and of sufficient thickness to constitute a support for said bulb.

13. An industrial thermometer comprising a scale case, having an open front face, a scale therein, a metal frame secured on the front face of said case, a glass plate positioned within said metal frame, a gasket between the peripheral edge portions of one face of said glass plate and the interior surface of said metal frame, a second gasket between the peripheral edge portions of the other face of said glass plate and the contiguous front face of said case, providing a hermetic sealing of said scale case, a glass tube terminating in a bulb and having an expansible medium therein, metallic sheathing for said tube and bulb, the upper portion of said sheathing, throughout substantially the length of the scale, being cut away, the lower portion of said metallic sheathing surrounding the bulb portion of said tube, having the interior surface thereof spaced from said tube so as to constitute a bulb chamber, a connector secured to the scale case and depending therefrom, said connector having a depending, externally threaded portion surrounding the glass tube immediately above the bulb chamber, a circumferential flange at the top of the bulb chamber of said metallic sheathing in proximity to said depending portion of the connector, a nut having an inwardly extending flange engaging the circumferential flange at the top of the bulb chamber of the metallic sheathing to draw the circumferential flange against the lower end of the connector in a seal tight manner, and a metallic cylindrical casing surrounding the lower portion of said metal sheathing.

14. An industrial thermometer comprising a scale case having an open front face, a scale therein, a metal frame secured on the front face of said case, a glass plate positioned within said cast metal frame, a gasket between the peripheral edge portions of one face of said glass plate and the interior surface of said cast metal frame, a second gasket between the peripheral edge portion of the other face of said glass plate and the contiguous front face of said case, providing a hermetic sealing of said scale case, a glass tube, terminating in a bulb and having an expansible medium therein, a metallic sheathing for said tube comprising upper and lower portions, the upper portion of said sheathing, throughout substantially the length of the scale, being cut away, the lower portion of said metallic sheathing surrounding the bulb portion of said tube having the interior surface thereof spaced from said tube so as to constitute a bulb chamber, the upper portion of said metallic sheathing for the thermometer tube telescoping within and being supported by the lower portion of said metallic sheathing for the bulb, a connector secured to the scale case and depending therefrom, said connector having a depending externally threaded portion surrounding the glass tube immediately above the bulb chamber, a circumferential flange at the top of the bulb chamber of the lower portion of said metallic sheathing, a nut having an inwardly extending flange engaging the circumferential flange at the top of the bulb chamber of the metallic sheathing to draw the circumferential flange against the lower end of the connector in a seal-tight manner, and a metallic cylindrical casing surrounding the lower portion of said metal sheathing.

AUGUST B. HOHMANN.